United States Patent [19]

Parzych

[11] Patent Number: 5,709,529
[45] Date of Patent: Jan. 20, 1998

[54] OPTIMIZATION OF TURBOMACHINERY HARMONICS

[75] Inventor: David J. Parzych, Orlando, Fla.

[73] Assignee: Westinghouse Electric Corporation, Pittsburgh, Pa.

[21] Appl. No.: 557,641

[22] Filed: Nov. 14, 1995

[51] Int. Cl.[6] ................................ F01D 25/04
[52] U.S. Cl. ................ 415/119; 60/725; 181/210; 181/214; 181/224
[58] Field of Search ............... 415/119, 183, 415/184, 191, 193, 196, 197, 208.1, 208.2, 209.1, 211.2, 199.4, 199.5; 60/725; 181/200, 210, 214, 224

[56] References Cited

U.S. PATENT DOCUMENTS

| 3,107,046 | 10/1963 | Frankel et al. | 415/191 |
| 3,194,487 | 7/1965 | Tyler et al. | |
| 3,739,872 | 6/1973 | McNair | 415/119 |
| 3,819,008 | 6/1974 | Evans et al. | 415/119 |
| 3,890,060 | 6/1975 | Lipstein | 415/119 |
| 5,169,288 | 12/1992 | Gliebe et al. | |

FOREIGN PATENT DOCUMENTS 2600860  6/1977  Germany ................ 415/119

Primary Examiner—Edward K. Look
Assistant Examiner—Christopher Verdier
Attorney, Agent, or Firm—M. G. Panian

[57] ABSTRACT

A turbomachine assembly includes a number of circumferentially spaced rotor blades, a number V of circumferentially spaced guide vanes axially adjacent to the rotor blades, an annular chamber surrounding the rotor blades, and an intake and exhaust for receiving and discharging air that passes through the annular chamber. When the turbomachine is in operation, spinning mode tones are generated by the interaction of the rotor and guide vanes. These tones are minimized by selecting a number of vanes relative to the number of blades so that selected tones propagate axial to the intake and exhaust of the turbomachine. A sound absorptive material is then positioned so that the tones impinge upon it. Moreover, a tuned duct is positioned in the path of the remaining tones. The turning vanes, placed within the tuned duct, cancel the remaining tones travelling through the duct.

29 Claims, 2 Drawing Sheets

OPTIMIZATION OF TURBOMACHINERY HARMONICS

FIELD OF THE INVENTION

This invention relates generally to the field of turbomachinery. More specifically, this invention relates to a system for improved attenuation of the noise generated by the interaction of rotor blades and stationary guide vanes in industrial turbomachinery.

BACKGROUND OF THE INVENTION

The aerodynamic interaction of rotor blades and stationary guide vane wakes adds a significant contribution to the noise produced by turbomachinery. The rotor blade rotation causes this turbomachinery generated noise to be periodic. Correspondingly, the noise is heard as tonal or harmonic noise. This type of rotor/vane tonal noise, known in the art as spinning mode tones, has been studied extensively in aircraft applications and noise reduction strategies have been deduced. In particular, the Tyler/Sofrin Spinning Mode Theory has been used for many years to describe how spinning mode tones escape from ducts and propagate as noise. Aircraft engine designers have exploited this theory by selecting rotor blade and vane combinations that minimize the propagation of the spinning mode tones along the engine axis.

Unlike industrial turbomachinery, with intake and exhaust systems typically connected to an extensive duct system, conventional aircraft engines have short intake and exhaust ducts that are contiguous to free space. Because of the difficulty of controlling noise once it has escaped into free space, designers of aircraft engines attempt to contain the spinning mode tones within the engine and prevent their propagation into the intake or exhaust. Such designs reduce the noise by creating a phenomenon known as "cut-off," or by directing the spinning mode tones to impinge on the walls of the interior of the engine, which is lined with a sound absorptive material. This technique causes the spinning mode tones to decay before exiting the engine. Consequently, the current state of the art teaches away from purposefully directing spinning mode tones out the intake or exhaust of a turboengine.

Other background material, not relevant to the design of aircraft engines, but relevant to the current invention, concerns duct systems. Duct systems, such as those in industrial machinery, typically have bends to direct airflow. When pressurized air flows through such bends, a pressure drop occurs. To alleviate this problem, some designs position turning vanes within the duct bends. Such vanes minimize pressure drops across the bends and provide smooth air flow, thus enhancing the aerodynamic performance of upstream or downstream machinery. However, the placement of the vanes within the bends has not been used to enhance the sound attenuation capability of the duct.

Moreover, although the combination of turning vanes and duct bends have not been used to attenuate noise, other means have been used to attenuate noise within a duct. For example, duct branches have been used to attenuate some of the noise. Such a design directs some of the noise through a branch that lengthens the path of the sound travelling through the branch. By selecting the proper branch length, the branch noise rejoins the main duct noise 180 degrees out of phase. Consequently, a portion of the noise cancels out. However, adding the additional duct to branch the sound is cumbersome and does not take advantage of the bends in the duct necessary to control the airflow.

SUMMARY OF THE INVENTION

In a typical turbomachine, there is a number B of circumferentially spaced rotor blades, a number V of circumferentially spaced guide vanes axially adjacent to the rotor blades, an annular chamber surrounding the rotor blades, and an intake and exhaust for receiving and discharging air that passes through the annular chamber. When the turbomachine is in operation spinning mode tones are generated by the interaction of the rotor and guide vanes. According to the present invention, these tones are minimized by selecting the number of vanes V relative to the number of blades B such that the propagation path of substantially all of the harmonics of the spinning mode tones is substantially axial to the annular chamber intake and exhaust. A sound absorptive material is positioned perpendicular to the propagation path of the spinning mode tones such that the tones impinge thereon and are attenuated thereby. In a preferred embodiment, the sound absorptive material is placed in the intake of the turbomachine.

Such machines are usually coupled to ducts through which the air flows. In addition to the air flow, the spinning mode tones generated by the turbomachine tend to travel through these ducts. According to the present invention, a tuned duct is positioned in the path of the spinning mode tones. This tuned duct is connected to either the intake or the exhaust, or both, of the annular chamber and has a radial bend that forms a partial circle with an arc of $\phi$ radians. A number of turning vanes are concentrically spaced within the bend, with each turning vane being spaced a distance D from each adjacent turning vane. The distance D is related to the arc $\phi$ of the radial bend and the frequency of the spinning mode tones. The turning vanes, thus placed, effectively cancel a plurality of the harmonics of the spinning mode tones travelling through the duct. In a preferred embodiment, the relationship between the distance D and the arc $\phi$ is chosen to cancel only the odd harmonics of the spinning mode tones.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed.

In the drawings.

DETAILED DESCRIPTION OF THE PREFERRED EMBODIMENTS

Figure 1:
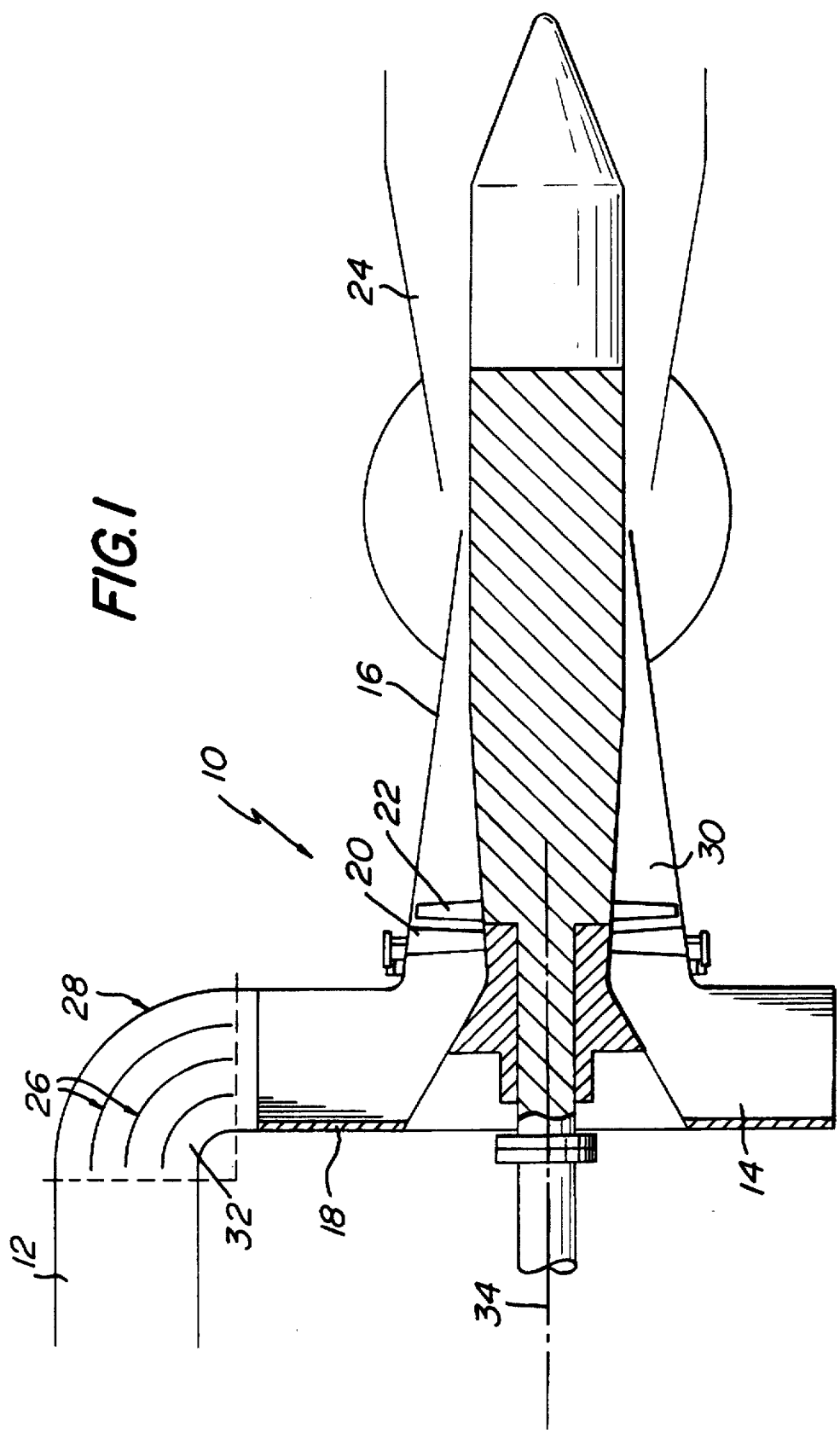
FIG. 1 illustrates, in simplified form, a cross section of a turbomachine and associated duct system and depicts a preferred embodiment of the spinning mode tone sound attenuation system of the present invention.

Referring now to the drawings wherein like numerals indicate like elements throughout, FIG. 1 depicts an industrial turbine system 10 including the sound attenuation features of the present invention. Turbine system 10 includes an intake duct 12 for supplying an intake stream of high pressure gas, and an intake manifold 14 for supplying the gas to the turbine 16. The intake manifold 14 features an sound absorptive surface 18. The high pressure gas is routed through a set of circumferentially spaced intake guide vanes 20 and to a set of circumferentially spaced rotor guide blades 22, which are surrounded by an annular chamber 30. The high pressure gas then exits through the exhaust system 24.

The interaction of inlet guide vanes 20 with rotor blades 22 as well as other guide vane rotor blade sets (not shown) generate spinning mode tones. These spinning mode tones are periodic pressure patterns that spin about the turbine axis 34, and are perceived as noise to the human observer. These pressure pulses have zero or more lobes relative to the number and rotation speed of the rotor blades 22 as well as the number of inlet guide vanes 20. When the pressure pulse has zero lobes then a zeroth order spinning mode has occurred. The number of rotor blades 22 multiplied by the rotor speed is the fundamental, or blade-pass frequency, of the spinning mode tones. When a combination of inlet guide vanes 20 and rotor blades 22 are selected such that the number of lobes in the spinning mode is zero then harmonics of the spinning mode tones propagate parallel to the turbine axis 34 and out of the turbine 16. The number of lobes can be determined by the equation:

$$N = |m \cdot B + k \cdot V|;$$

where:
- m is the harmonic and can take on any integer value from 1 to infinity;
- B is the number of rotor blades;
- k is an index that ranges over all integer values from −infinity to +infinity; and,
- V is the number of stationary guide vanes.

Thus, N is equal to zero for a particular blade count B, a particular inlet guide vane count V, and a particular harmonic m.

Figure 2:
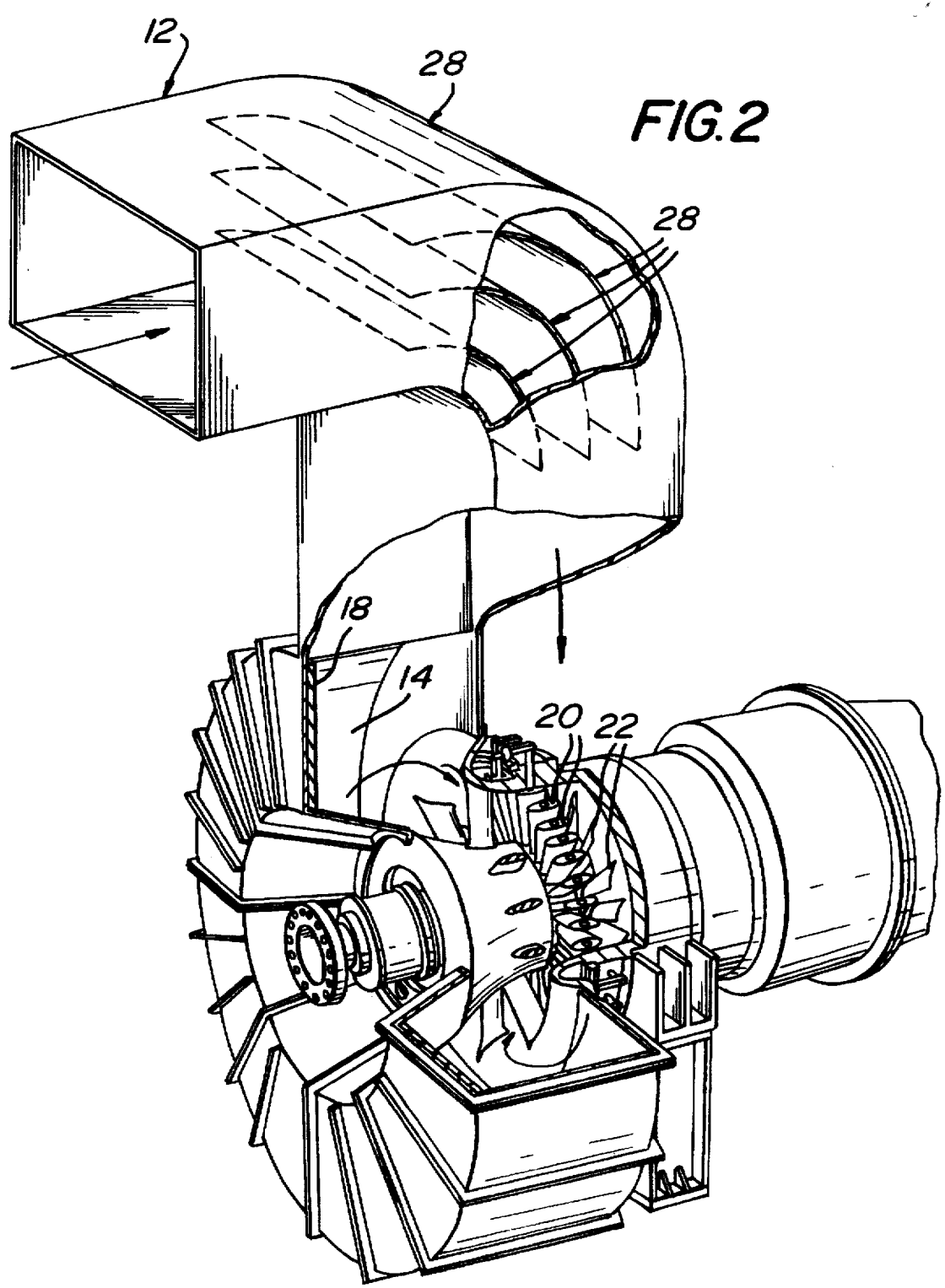
FIG. 2 is a partial view of a turbomachine illustrating the rotor blades and guide vanes thereof.

Referring also to FIG. 2, the zeroth order spinning mode can be forced to occur when there are an integer number of inlet guide vanes 20 relative to the number of rotor blades 22, or when an integer number times the number of inlet guide vanes 20 is equal to an integer number times the number of rotor blades 22, i.e. when $|m*B|=|k*V|$ and k and m are both integers. The zeroth order spinning mode can be forced to occur at all harmonics of the blade-pass frequency when the number of inlet guide vanes 20 equals the number of rotor blades 22. Alternatively, if the number of inlet guide vanes 20 selected is equal to twice the number of rotor blades 22 then the zeroth order spinning mode occurs only on even harmonics of the blade-pass frequency. In the preferred embodiment, twice the number of guide vanes 20 relative to the number of rotor blades 22 is selected. Thus, the even harmonics of the blade-pass frequency are propagated substantially along the turbine axis 34 and into the intake manifold 14.

A sound absorptive material 18 is placed perpendicular to the propagation path of the spinning mode tones. Preferably, as illustrated in FIG. 1, this sound absorptive material 18 is attached to the inside of the intake manifold 14. As a result, the selected harmonics of the spinning mode tones impinge at a perpendicular incidence upon the face of the sound absorptive material 18. The sound absorptive material selected is preferably a bulk absorber with absorption coefficient of 0.99 or greater. For example, the bulk absorber selected may be fabricated from mineral wool, fiberglass, or ceramic fiber. As a result of the harmonics impinging on the sound absorptive material, the sound levels of the zeroth order mode will be reduced by approximately 20 dB or greater. To a lesser degree, sound attenuation of modes other than the zeroth order mode will occur, but the effectiveness will decrease as the sound propagates into the material at grazing incidence.

The harmonics not absorbed by the sound absorptive material 18 will generally propagate out of the intake manifold 14 and out through the intake duct 12. According to the present invention, a tuned duct section 32 is placed in the path of the remaining harmonics. To attenuate these harmonics, turning vanes are fixed in the tuned duct 32. As the remaining harmonics propagate back through the intake duct they will turn through the duct bend 28 and pass through the turning vanes 26. By controlling the spacing between these turning vanes 26 relative to the radius of the duct bend 28 the remaining harmonics (primarily the odd harmonics) can be effectively attenuated. The confined path of the remaining harmonics, defined by each of the turning vanes 26, forces the harmonics to travel increased distances for each of the larger radius turns. The harmonic at each path defined by the turning vanes 26 will be 180 degrees out of phase with the identical harmonic travelling through an adjacent path when the turning vane spacing is selected to be equal to:

$$\frac{1.5\lambda}{\phi};$$

where:
- $\phi$ is the arc of the turn in radians; and,
- $\lambda$ is the wavelength of the fundamental harmonic. The turning vanes 26 will each be a partial circle defining the arc $\phi$ and each successive turning vane 26 will increase in radius by:

$$n \cdot \frac{1.5\lambda}{\phi};$$

where
n is the vane number.

The duct bend 28 and turning vane 26 combination will cancel all odd harmonics (1, 3, 5, etc.) while providing no benefit at the even harmonics (2, 4, 6 times, etc.). However, tonal noise sources, such as spinning mode tones, typically have peak frequencies at the fundamental harmonic with decreasing sound levels as the harmonics increase. By at least cancelling the odd harmonics, which include the fundamental harmonic, a significant effect on the sound level is accomplished. Moreover, the sound absorptive material 18 will have effectively attenuated the even harmonics before they reach the duct bend 28. While the preferred radius of the duct is 1.5 radians, Applicant recognizes that manufacturing constraints may dictate that a 90 degree bend is used with a corresponding radius of Π/2.

The turning vanes 26 can be designed to also cancel some of the even harmonics by selecting the distance between turning vanes to be:

$$\frac{0.75\lambda}{\phi}$$

This design will provide partial cancellation at harmonics 1, 2, 3, 5, 6, 7, 9, 10 times, etc. of the blade-pass frequency. The partial cancellation will occur at all odd harmonics and every other even harmonic.

In the preferred embodiment, all of the components are optimized to provide a system that effectively cancels all harmonics of the spinning mode tones. In such an embodiment, the vane/blade ratio and sound absorptive material 18 are optimized to attenuate the even harmonics; whereas, the tuned duct 32 is optimized to attenuate the odd harmonics. To accomplish this system, the number of inlet guide vanes 20 selected is twice the number of rotor blades 22 selected. For example, in a turbomachine with nineteen rotor blades 22, thirty-eight inlet guide vanes 20 are selected. This combination directs the even harmonics substantially parallel to the turbine axis 34. A bulk absorber 18 is then placed in a path perpendicular to the even harmonics. This arrangement, while effectively attenuating the even harmonics, does very little to attenuate the odd harmonics. Thus, the odd harmonics continue through the duct system 12. The tuned duct 32 placed in the path of the odd harmonics is optimized to attenuate these odd harmonics. The effect of the entire system is to cancel substantially all of the harmonics of the spinning mode tones.

The present invention may be embodied in other specific forms without departing from the spirit or essential attributes thereof, and accordingly, reference should be made to the appended claims, rather than to the foregoing specification, as indicating the scope of the invention.

What is claimed is:

1. A turbomachine assembly comprising:

a number B of circumferentially spaced rotor blades;

a number V of circumferentially spaced inlet guide vanes axially adjacent to said rotor blades;

an annular chamber surrounding said rotor blades and said inlet guide vanes and having an intake for receiving air and an exhaust for discharging air, said rotor blades and inlet guide vanes generating spinning mode tones when said turbomachine assembly is in operation;

said vane number V being selected relative to said blade number B to create a propagation path of spinning mode tones in a path such that substantially all of at least selected harmonics of the spinning mode tones are oriented substantially axial to said annular chamber intake and exhaust;

a sound absorptive material having a face disposed within said propagation path of said spinning mode tones and said face being positioned perpendicular to the propagation path of said spinning mode tones to absorb the tones impinging thereon;

a tuned duct having a radial bend forming a partial circle with an arc of $\phi$ radians, said tuned duct being connected to at least one end of said annular chamber; and, a plurality of turning vanes within said radial bend of said tuned duct each concentrically spaced a distance D from an adjacent turning vane;

there being a relationship between said distance D and said arc $\phi$ effective to substantially cancel a plurality of harmonics of the spinning mode tones.

2. A turbomachine assembly as in claim 1 wherein said vane number V is substantially equal to an integer multiple of said blade number B.

3. A turbomachine assembly as in claim 1 wherein said selected harmonics comprise substantially all harmonics of the spinning mode tones.

4. A turbomachine assembly as in claim 3 wherein said vane number V is substantially equal to said blade number B.

5. A turbomachine assembly as in claim 1 wherein said selected harmonics comprise substantially all even harmonics of the spinning mode tones.

6. A turbomachine assembly as in claim 5 wherein said vane number V is substantially equal to twice said blade number B.

7. A turbomachine assembly as in claim 1 wherein said distance D is substantially equal to:

$$n \cdot \frac{0.75\lambda}{\phi};$$

where $\lambda$ is the wavelength of the fundamental harmonic of the periodic sound wave, and n is an integer ranging from 1 to 2.

8. A turbomachine assembly as in claim 1 wherein said arc $\phi$ has a length substantially equal to 1.5 radians.

9. A turbomachine assembly as in claim 1 wherein said sound absorptive material is disposed in the spinning mode tone propagation path on said intake of said annular chamber.

10. A turbomachine assembly as in claim 1 wherein said sound absorptive material has an absorption coefficient greater than or equal to 0.99.

11. A turbomachine assembly as in claim 10 wherein said sound absorptive material is a bulk absorber.

12. A turbomachine assembly as in claim 11 wherein said bulk absorber is one of mineral wool, fiberglass, and ceramic fiber.

13. A turbomachine assembly as in claim 2 wherein said tuned duct is disposed in said intake of said annular chamber.

14. A turbomachine assembly comprising:

a number B of circumferentially spaced rotor blades;

a number V of circumferentially spaced inlet guide vanes axially adjacent to said rotor blades;

an annular chamber surrounding said rotor blades and said inlet guide vanes having an intake for receiving air and an exhaust for discharging air, said rotor blades and inlet guide vanes generating spinning mode tones when said turbomachine assembly is in operation;

said vane number V being selected relative to said blade number B to create a propagation path of spinning mode tones in a path such that substantially all of at least selected harmonics of the spinning mode tones are oriented substantially axial to said annular chamber intake and exhaust;

a sound absorptive material having a face disposed within said propagation path of said spinning mode tones and said face being positioned perpendicular to the propagation path of said spinning mode tones to absorb the tones impinging thereon; and a tuned duct connected to at least one end of said annular chamber, said tuned duct having a radial bend and a plurality of turning vanes disposed within said radial bend such that a plurality of harmonics of the spinning mode tones are substantially canceled thereby.

15. A turbomachine assembly as in claim 14 wherein said vane number V is substantially equal to an integer multiple of said blade number B.

16. A turbomachine assembly as in claim 14 wherein said selected harmonics comprise substantially all harmonics of the spinning mode tones.

17. A turbomachine assembly as in claim 16 wherein said vane number V is substantially equal to said blade number B.

18. A turbomachine assembly as in claim 17 wherein said tuned duct is disposed in said intake of said annular chamber.

19. A turbomachine assembly as in claim 14 wherein said selected harmonics comprise substantially all even harmonics of the spinning mode tones.

20. A turbomachine assembly as in claim 19 wherein said vane number V is substantially equal to twice said blade number B.

21. A turbomachine assembly as in claim 14 wherein said sound absorptive material is disposed in the spinning mode tone propagation path on said intake of said annular chamber.

22. A turbomachine assembly as in claim 14 wherein said sound absorptive material has an absorption coefficient greater than or equal to 0.99.

23. A turbomachine assembly as in claim 22 wherein said sound absorptive material is a bulk absorber.

24. A turbomachine assembly as in claim 23 wherein said bulk absorber is one of mineral wool, fiberglass, and ceramic fiber.

25. A turbomachine assembly comprising:

a number of circumferentially spaced rotor blades;

a number of circumferentially spaced inlet guide vanes axially adjacent to said rotor blades;

an annular chamber surrounding said rotor blades and said inlet guide vanes and having an intake for receiving air and an exhaust for discharging air, said rotor blades and inlet guide vanes generating spinning mode tones when said turbomachine assembly is in operation;

a tuned duct having a radial bend forming a partial circle with an arc of $\phi$ radians, said tuned duct connected to at least one end of said annular chamber;

a plurality of turning vanes concentrically spaced a distance D within said radial bend of said tuned duct;

said distance D relative to said arc $\phi$ being effective to substantially cancel a plurality of harmonics of the spinning mode tones.

26. A turbomachine assembly as in claim 25 wherein said distance D is substantially equal to:

$$n \cdot \frac{0.75\lambda}{\phi} ;$$

where $\lambda$ is the wavelength fundamental harmonic of the periodic sound wave, and n is an integer ranging from 1 to 2.

27. A turbomachine assembly as in claim 26 wherein said tuned duct is disposed in said intake of said annular chamber.

28. A turbomachine assembly as in claim 25 wherein said arc $\phi$ has a length substantially equal to 1.5 radians.

29. A turbomachine assembly as in claim 14 wherein the radial bend of said tuned duct forms a partial circle with an arc of $\phi$ radians, wherein said plurality of turning vanes are concentrically spaced a distance D from an adjacent turning vane within said radial bend, there being a relationship between said distance D and said arc $\phi$ effective to substantially cancel said plurality of harmonics of said spinning mode tones.

\* \* \* \* \*